United States Patent
Zhang et al.

(10) Patent No.: US 11,164,373 B2
(45) Date of Patent: Nov. 2, 2021

(54) GRAPHICS PROCESSING APPARATUS

(71) Applicant: GlenFly Technology Co., Ltd., Shanghai (CN)

(72) Inventors: Huaisheng Zhang, Shanghai (CN); Maoxin Sun, Shanghai (CN); Juding Zheng, Shanghai (CN)

(73) Assignee: GlenFly Technology Co., Ltd., Shanghai (CN)

( * ) Notice: Subject to any disclaimer, the term of this patent is extended or adjusted under 35 U.S.C. 154(b) by 0 days.

(21) Appl. No.: 16/867,503

(22) Filed: May 5, 2020

(65) Prior Publication Data
US 2021/0256762 A1    Aug. 19, 2021

(30) Foreign Application Priority Data
Feb. 14, 2020   (CN) .......................... 202010092007.6

(51) Int. Cl.
*G06T 17/20*     (2006.01)
*G06T 15/80*     (2011.01)

(52) U.S. Cl.
CPC .............. *G06T 17/20* (2013.01); *G06T 15/80* (2013.01)

(58) Field of Classification Search
CPC ......... G06T 17/20; G06T 15/80; G06T 17/30; G06T 15/50
See application file for complete search history.

(56) References Cited

U.S. PATENT DOCUMENTS

2014/0098117 A1* 4/2014 Goel ..................... G06T 15/005
                                                            345/522
2018/0308285 A1* 10/2018 Doyle .................. G06T 15/005

* cited by examiner

*Primary Examiner* — Said Broome
(74) *Attorney, Agent, or Firm* — JCIPRNET (57) ABSTRACT

A graphics processing apparatus includes a tessellation circuit and a post-processing circuit. The tessellation circuit performs tessellation processing to subdivide a patch in an image frame into a plurality of triangles. The tessellation circuit further performs triangle striping processing to convert data of the plurality of triangles into data of a triangle strip. The post-processing circuit performs subsequent processing on the data of the triangle strip.

15 Claims, 7 Drawing Sheets

GRAPHICS PROCESSING APPARATUS

CROSS-REFERENCE TO RELATED APPLICATION

This application claims the priority benefit of China application serial no. 202010092007.6, filed on Feb. 14, 2020. The entirety of the above-mentioned patent application is hereby incorporated by reference herein and made a part of this specification.

BACKGROUND OF THE DISCLOSURE

1. Field of the Disclosure

The disclosure relates to an electronic apparatus, and in particular, to a graphics processing apparatus.

2. Description of Related Art

In a pipeline of graphic drawing (such as three-dimensional scene drawing), tessellation is an important step in representing surface details of an object. Tessellation is widely applied on D3D, OpenGL, Vulkan, and other drawing platforms. According to a tessellation method, an original patch of a model is subdivided into a large number of triangles, so that a model surface (such as a face) becomes delicate and smooth, or a model surface (such as a land form or a sea surface) becomes uneven. Therefore, tessellation may enhance the realism of the graphic drawing.

Each triangle needs to be represented by three vertexes. A conventional tessellation method is to record the three vertexes of each triangle without considering the continuity between these vertexes. In other words, each triangle is independent. In any case, the tessellation method produces a huge number of triangles. Assuming that the tessellation method produces n triangles, a conventional pipeline needs to store 3n triangle vertexes. Such a huge number of triangle vertexes cause much burden on subsequent calculation and storage. A larger number of vertexes mean that the pipeline requires more calculation time to process these triangle vertexes and requires more storage space to store these triangle vertexes.

It should be noted that content in "Description of Related Art" is used to help understand the disclosure. Some content (or all content) disclosed in "Description of Related Art" may be not conventional technologies known to persons of ordinary skill in the art. The content being disclosed in "Description of Related Art" does not mean that the content has been known by persons of ordinary skill in the art.

SUMMARY OF THE DISCLOSURE

The disclosure provides a graphics processing apparatus capable of performing triangle striping processing on a plurality of triangles generated in tessellation processing to reduce a data amount of vertexes.

The graphics processing apparatus of the disclosure includes a tessellation circuit and a post-processing circuit. The tessellation circuit is configured to perform tessellation processing to subdivide a patch in an image frame into a plurality of triangles. The tessellation circuit is further configured to perform triangle striping processing to convert data of the plurality of triangles into data of a triangle strip. The post-processing circuit is coupled to the tessellation circuit to receive the data of the triangle strip. The post-processing circuit is configured to perform subsequent processing on the data of the triangle strip.

Based on the above, the tessellation circuit in embodiments of the disclosure may subdivide a patch in an image frame into a plurality of triangles and then converts the triangles into at least one triangle strip by considering continuity between vertexes of the triangles. Therefore, the graphics processing apparatus may significantly reduce a data amount of the vertexes of the triangles.

To make the features and advantages of the disclosure clear and easy to understand, the following gives a detailed description of the embodiments with reference to accompanying drawings.

DESCRIPTION OF THE EMBODIMENTS

The term "coupled (or connected)" used in the entire specification (including the claims) may mean any direct or indirect connection means. For example, a first apparatus coupled (connected) to a second apparatus described herein should be interpreted as that the first apparatus may be directly connected to the second apparatus, or that the first apparatus may be indirectly connected to the second apparatus by other apparatuses or by some means of connection. Terms such as "first" and "second" used in the entire specification (including the claims) are used to name components (elements) or to distinguish between different embodiments or ranges, and are not intended to define an upper or a lower limit of a quantity of components or an order of components. Wherever possible, the same reference numbers are used in the drawings and the description to refer to the same or like parts, components, or steps. For parts, components, or steps denoted by same reference numbers or names, reference can be made to the related descriptions.

Figure 1:
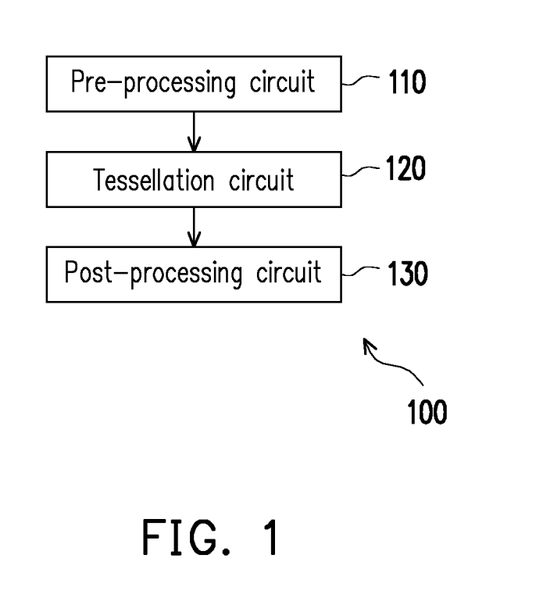
FIG. 1 is a schematic diagram of circuit blocks of a graphics processing apparatus according to an embodiment of the disclosure.

FIG. 1 is a schematic diagram of circuit blocks of a graphics processing apparatus 100 according to an embodiment of the disclosure. The graphics processing apparatus 100 includes a pre-processing circuit 110, a tessellation circuit 120, and a post-processing circuit 130.

Figure 2:
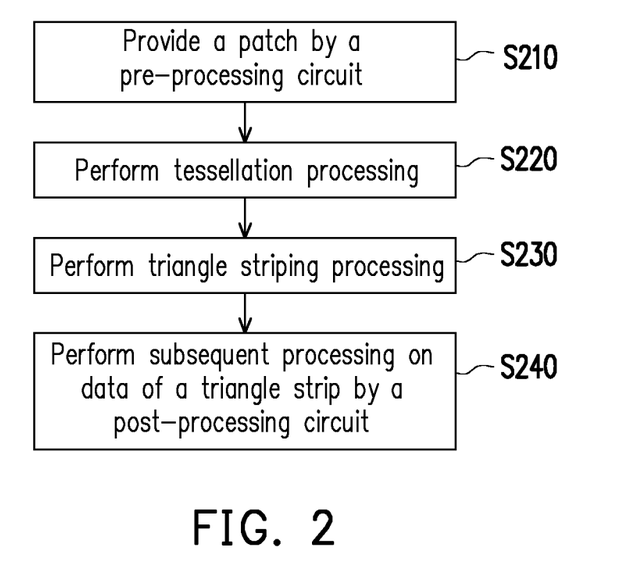
FIG. 2 is a schematic flow chart of a graphics processing method according to an embodiment of the disclosure.

FIG. 2 is a schematic flow chart of a graphics processing method according to an embodiment of the disclosure. Referring to FIG. 1 and FIG. 2, the pre-processing circuit 110 is coupled to the tessellation circuit 120 to provide a patch (step S210). According to a design requirement, the pre-processing circuit 110 may include a vertex shader and (or) other image frame processing circuits. Generally, one image frame includes a plurality of patches. The pre-processing circuit 110 may transfer the patches to the tessellation circuit 120.

The tessellation circuit 120 may perform tessellation processing on the patch provided by the pre-processing circuit 110 (step S220), to subdivide the patch in an image frame into a plurality of triangles. According to a design requirement, in some embodiments, the tessellation circuit 120 may include a hull shader, a domain shader, a tessellator, and (or) other image frame processing circuits. The tessellation circuit 120 may use the hull shader to complete pre-processing for the tessellator and uses the domain shader to complete post-processing for the tessellator. The tessellator may generate a large number of new vertexes in real time according to a subdivision parameter output by the hull shader. Then the domain shader may calculate spatial locations and colors of the new vertexes.

This embodiment does not limit implementation details of the tessellation processing. According to a design requirement, in some embodiments, the tessellation processing performed by the tessellation circuit 120 includes: dividing the patch into a plurality of ring blocks; dividing one of the plurality of ring blocks into a plurality of trapezoid blocks; and dividing one of the plurality of trapezoid blocks into the plurality of triangles.

Figure 3:
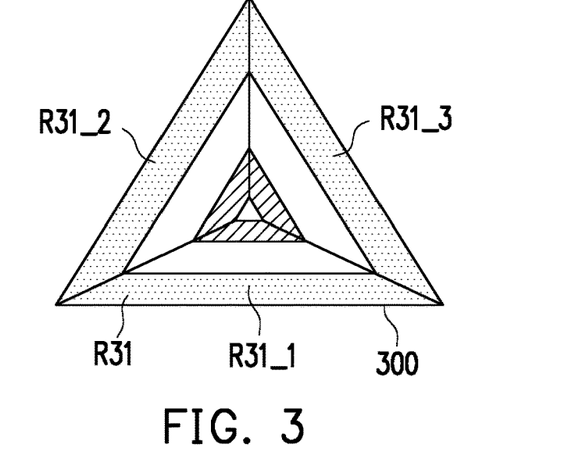
FIG. 3 is an example of using a triangle as a patch.

FIG. 3 is an example of using a triangle as a patch. Referring to FIG. 1 and FIG. 3, a patch 300 shown in FIG. 3 may be divided into four ring blocks (such as a ring block R31), with a central ring block degenerating into a triangle (or even a center point). The tessellation circuit 120 may divide each of the plurality of ring blocks into a plurality of trapezoid blocks. For example, the ring block R31 may be divided into trapezoid blocks R31_1, R31_2, and R31_3. The tessellation circuit 120 may divide each of the plurality of trapezoid blocks into a plurality of triangles.

Figure 4:
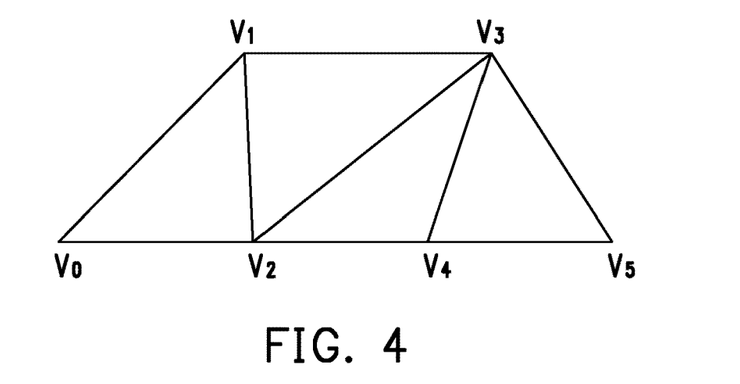
FIG. 4 is an example of dividing a trapezoid block into a plurality of triangles.

FIG. 4 is an example of dividing a trapezoid block into a plurality of triangles. The trapezoid block shown in FIG. 4 includes four vertexes $V_0$, $V_1$, $V_3$, and $V_5$. For each trapezoid block (for example, the trapezoid block R31_1) shown in FIG. 3, reference may be made to a related description of the trapezoid block shown in FIG. 4. The tessellation circuit 120 may divide the trapezoid block shown in FIG. 4 into four triangles $\Delta V_0 V_1 V_2$, $\Delta V_1 V_3 V_2$, $\Delta V_2 V_3 V_4$, and $\Delta V_3 V_5 V_4$. The triangle division manner shown in FIG. 4 is only an example. An actual division manner may be determined according to a design requirement.

Figure 5:
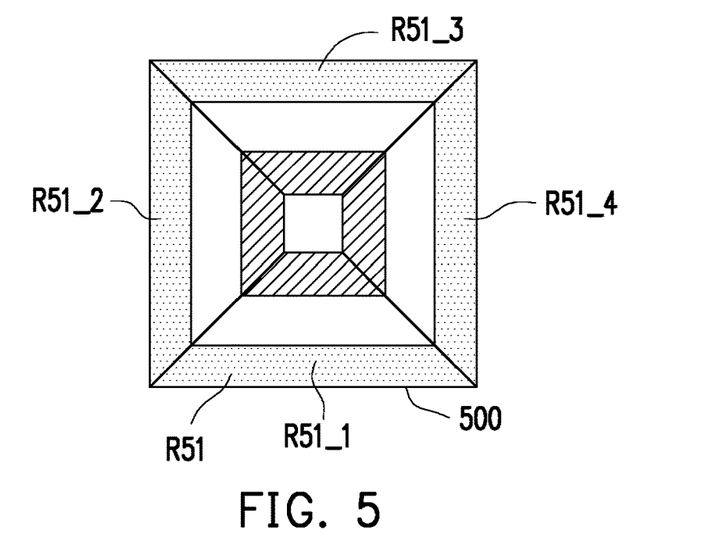
FIG. 5 is an example of using a quadrangle as a patch.

FIG. 5 is an example of using a quadrangle as a patch. Referring to FIG. 1 and FIG. 5, a patch 500 shown in FIG. 5 may be divided into four ring blocks (such as a ring block R51), with a central ring block degenerating into a quadrangle (or even a center point). The tessellation circuit 120 may divide each of the plurality of ring blocks into a plurality of trapezoid blocks. For example, the ring block R51 may be divided into trapezoid blocks R51_1, R51_2, R51_3, and R51_4. The tessellation circuit 120 may divide each of the plurality of trapezoid blocks into a plurality of triangles. For each trapezoid block (for example, the trapezoid block R51_1) shown in FIG. 5, reference may be made to a related description of the trapezoid block shown in FIG. 4.

Referring to FIG. 1 and FIG. 2, data of one triangle includes coordinates of three vertexes. By analog, data of n triangles includes coordinates of 3*n vertexes. Generally, there are a huge number of triangles. A large number of vertex coordinates (triangle data) occupy large storage space and increase subsequent calculation burden. The tessellation circuit 120 may further perform triangle striping processing on the triangles generated in the tessellation processing (step S230) to convert data of the triangles into data of a triangle strip.

Generally, most of the triangles generated in the tessellation processing share vertexes. The tessellation circuit 120 may reconstruct the data of the triangles in a triangle strip form to reduce a number of vertexes. For example (referring to FIG. 4), it is assumed that there are four triangles $\Delta V_0 V_1 V_2$, $\Delta V_1 V_3 V_2$, $\Delta V_2 V_3 V_4$, and $\Delta V_3 V_5 V_4$. Accordingly, data of the triangles includes coordinates of 3*4=12 vertexes. In any case, the four triangles are closely connected. The tessellation circuit 120 may convert the data of the triangles into data of a triangle strip: $V_0 V_1 V_2 V_3 V_4 V_5$. The data of the triangle strip includes coordinates of 6 vertexes. Assuming that there are n triangles, theoretically, data of a triangle strip includes coordinates of n+2 vertexes. The triangle striping processing of "converting a plurality of triangles into a triangle strip" may effectively reduce a data amount (a number of vertexes) to reduce subsequent drawing and calculation burden.

Referring to FIG. 1 and FIG. 2, the post-processing circuit 130 is coupled to the tessellation circuit 120 to receive the data of the triangle strip. The post-processing circuit 130 may perform subsequent processing on the data of the triangle strip (step S240). According to a design requirement, the post-processing circuit 130 may include a geometry shader, a raster, a pixel shader, and (or) other image processing circuits.

Figure 6:
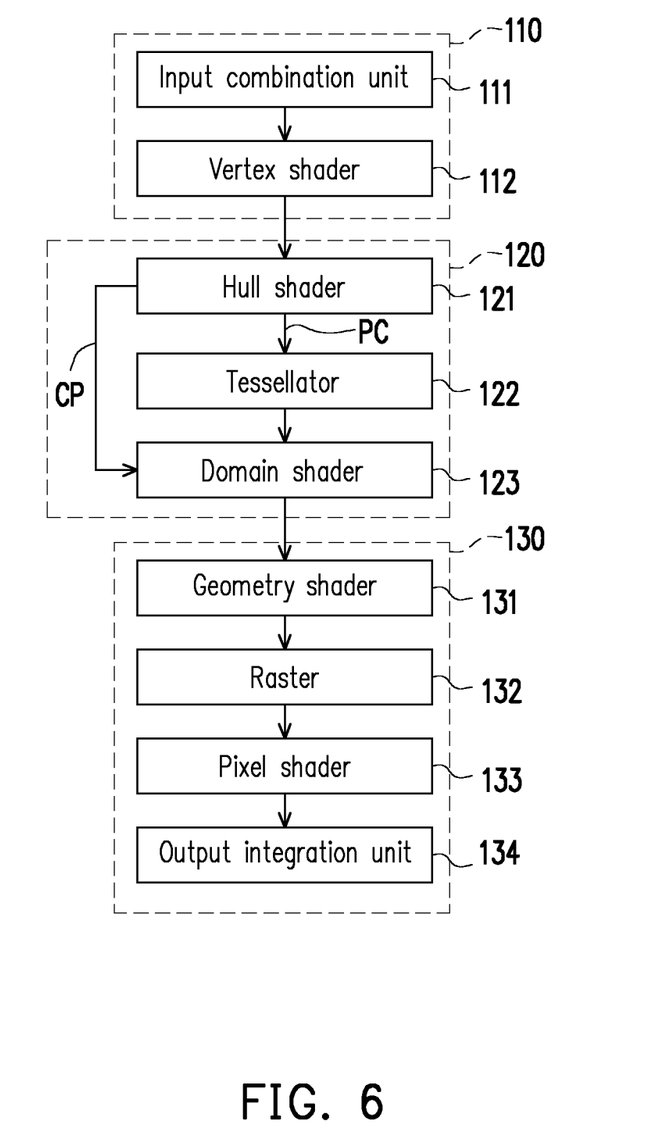
FIG. 6 is a schematic diagram of circuit blocks of a pre-processing circuit, a tessellation circuit, and a post-processing circuit that are shown in FIG. 1 according to an embodiment of the disclosure.

FIG. 6 is a schematic diagram of circuit blocks of the pre-processing circuit 110, the tessellation circuit 120, and the post-processing circuit 130 that are shown in FIG. 1 according to an embodiment of the disclosure. In the embodiment shown in FIG. 6, the pre-processing circuit 110 includes an input combination unit 111 and a vertex shader 112, and the post-processing circuit 130 includes a geometry shader 131, a raster 132, a pixel shader 133, and an output integration unit 134. The vertex shader 112 may transfer the patch to the tessellation circuit 120. In the embodiment shown in FIG. 6, the tessellation circuit 120 includes a hull shader 121, a tessellator 122, and a domain shader 123. The hull shader 121 may complete pre-calculation for the tessellation. The domain shader 123 may perform post-processing for the tessellation.

The hull shader 121 may calculate a plurality of control points CP and a control parameter (subdivision parameter) PC for each patch. The control parameter PC is transferred to the tessellator 122, to calculate coordinate values of a new vertex. The control points CP are transferred to the domain shader 123. According to the control points CP provided by the hull shader 121 and the vertex coordinate values provided by the tessellator 122, the domain shader 123 may perform interpolation to obtain final attribute information such as three-dimensional coordinates and colors. The domain shader 123 further outputs the generated new vertex data to the geometry shader 131 of the post-processing circuit 130, to perform subsequent geometric processing.

The tessellation circuit 120 is embedded into a graphic pipeline. A user may choose to turn on or off the tessellation circuit 120. If the tessellation circuit 120 is turned off, the output of the vertex shader 112 directly enters the geometry shader 131, to implement compatibility with different types of conventional drawing software.

Figure 7:
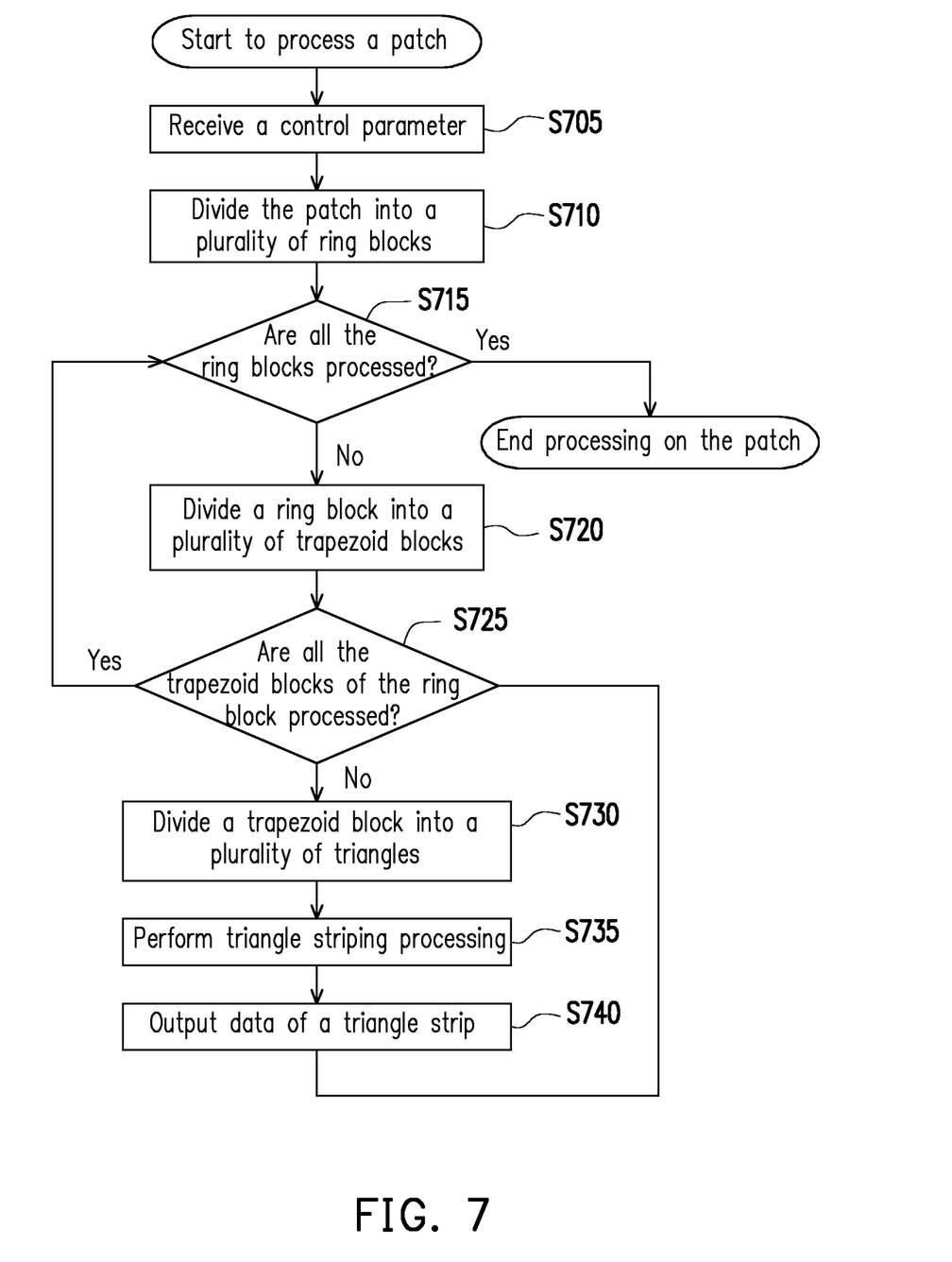
FIG. 7 is a schematic flow chart of an operation method of a tessellator shown in FIG. 6 according to an embodiment of the disclosure.

FIG. 7 is a schematic flow chart of an operation method of the tessellator 122 shown in FIG. 6 according to an embodiment of the disclosure. Referring to FIG. 6 and FIG. 7, in step S705, the tessellator 122 may receive a control parameter PC (a control parameter for a current patch) provided by the hull shader 121. In step S710, the tessellator 122 may divide the current patch into a plurality of ring blocks. The tessellator 122 may sequentially process all the ring blocks from outside to inside. If all the ring blocks are processed (a determining result of step S715 is "yes"), processing on the current patch ends.

If a ring block (a current ring block) has not been processed (a determining result of step S715 is "no"), the tessellator 122 may generate a plurality of trapezoid blocks based on the current ring block in a default sequence (for example, in a clockwise direction) (step S720). The tessellator 122 may generate a trapezoid block according to a type of the patch. If the patch is a triangle, 3 trapezoid blocks may be generated based on each ring block. If the patch is a quadrangle, 4 trapezoid blocks may be obtained based on each ring block. The tessellator 122 may divide each ring block to obtain a plurality of trapezoid blocks, and sequentially process the trapezoid blocks. If all the trapezoid blocks of the current ring block are processed (a determining result of step S725 is "yes"), the tessellator 122 may return to step S715 to process a next ring block.

If a trapezoid block (a current trapezoid block) of the current ring block has not been processed (a determining result of step S725 is "no"), the tessellator 122 may perform step S730. In step S730, the tessellator 122 may divide the current trapezoid block into a plurality of triangles. In step S735, the tessellator 122 may perform triangle striping processing on the triangles, to convert data of the triangles of the current trapezoid block into data of a triangle strip. In step S740, the tessellator 122 may output the data of the triangle strip of the current trapezoid block to the domain shader 123. Next, the tessellator 122 may return to step S725 to process a next trapezoid block, until all the trapezoid blocks of the current ring block are processed.

Figure 8:
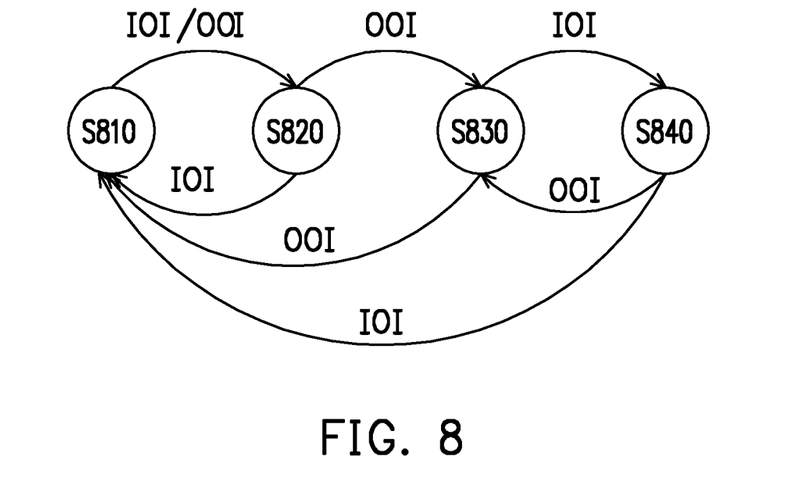
FIG. 8 is a schematic diagram of a finite state of a triangle striping processing step shown in FIG. 7 according to an embodiment of the disclosure.

FIG. 8 is a schematic diagram of a finite state of step S735 (the triangle striping processing step) shown in FIG. 7 according to an embodiment of the disclosure. In the embodiment shown in FIG. 8, the triangle striping processing includes state S810, state S820, state S830, and state S840. State S810 is an initial state. For ease of description, the triangles generated in step S730 may be classified into an "IOI type" triangle and an "OOI type" triangle. The "IOI type" triangle and the "OOI type" triangle are defined in FIG. 9 and FIG. 10.

Figure 9:
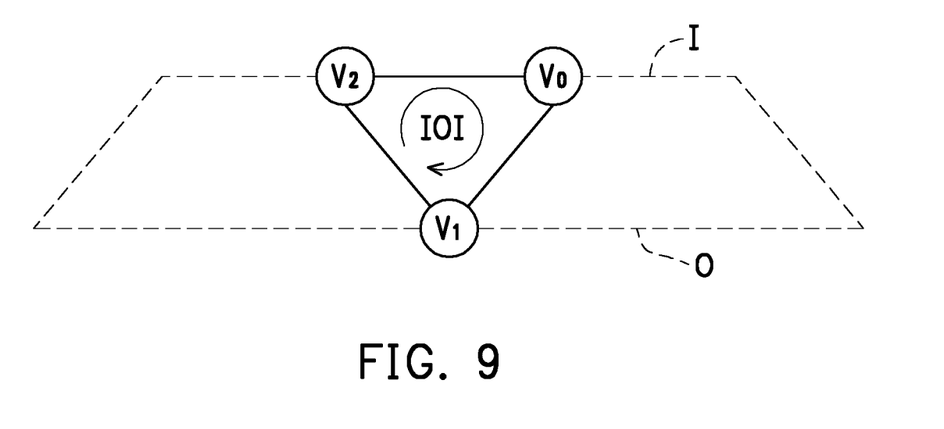
FIG. 9 is a schematic diagram of an "in-out-in (IOI) type" triangle according to an embodiment of the disclosure.

FIG. 9 is a schematic diagram of the "IOI type" triangle according to an embodiment of the disclosure. A graphic symbol "O" shown in FIG. 9 represents a lower base (an outer side, namely, a side facing towards an outer side of a ring block) of a trapezoid block. A graphic symbol "I" shown in FIG. 9 represents an upper base (an inner side, namely, a side facing towards an inner side of the ring block) of the trapezoid block. In a clockwise direction, as a triangle $\Delta V_0 V_1 V_2$ shown in FIG. 9 has vertexes $V_0$ and $V_2$ located on the inner side "I" and a vertex $V_1$ located on the outer side "O", the triangle $\Delta V_0 V_1 V_2$ shown in FIG. 9 is an "IOI type" triangle.

Figure 10:
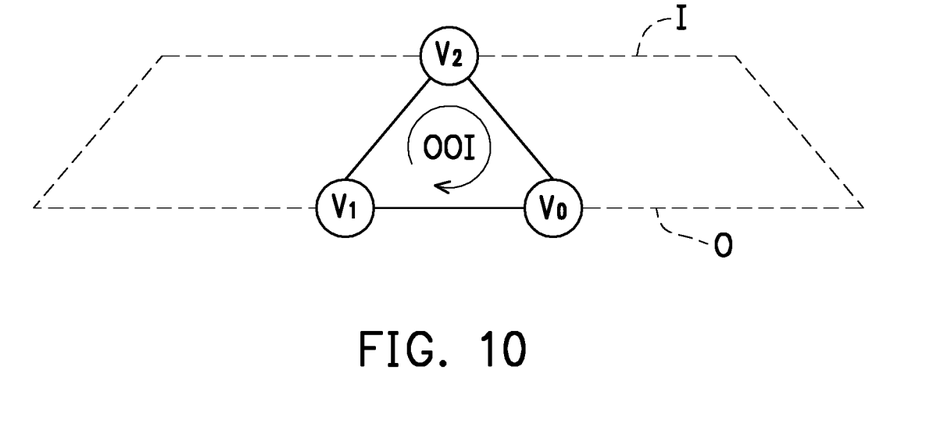
FIG. 10 is a schematic diagram of an "out-out-in (OOI) type" triangle according to an embodiment of the disclosure.

FIG. 10 is a schematic diagram of the "OOI type" triangle according to an embodiment of the disclosure. Same as the related description of FIG. 9, a graphic symbol "O" shown in FIG. 10 represents an outer side of a trapezoid block, and a graphic symbol "I" shown in FIG. 10 represents an inner side of the trapezoid block. In a clockwise direction, as a triangle $\Delta V_0 V_1 V_2$ shown in FIG. 10 has vertexes $V_0$ and $V_1$ located on the outer side "O" and a vertex $V_2$ located on the inner side "I", the triangle $\Delta V_0 V_1 V_2$ shown in FIG. 10 is an "OOI type" triangle.

Figure 11:
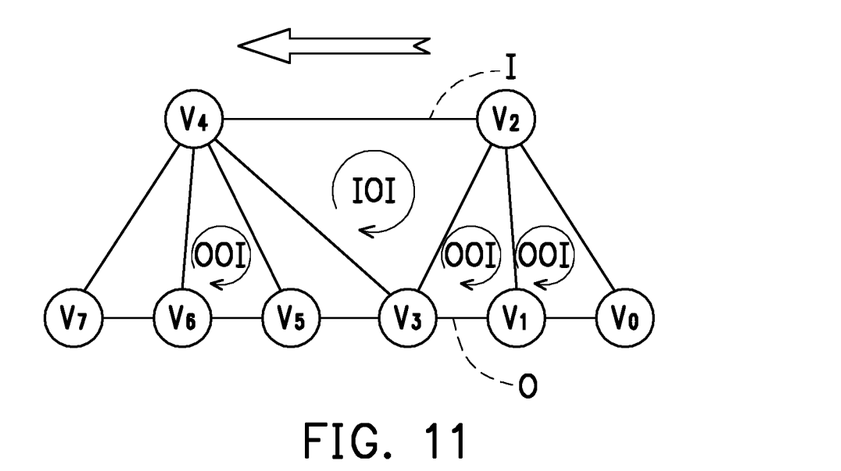
FIG. 11 is a schematic diagram of dividing a trapezoid block into a plurality of triangles according to an embodiment of the disclosure.

FIG. 11 is a schematic diagram of dividing a trapezoid block into a plurality of triangles according to an embodiment of the disclosure. Referring to FIG. 8 and FIG. 11, in step S730, the tessellator 122 may divide a trapezoid block "$V_0 V_7 V_4 V_2$" shown in FIG. 11 into a plurality of triangles: $\Delta V_0 V_1 V_2$, $\Delta V_1 V_3 V_2$, $\Delta V_2 V_3 V_4$, $\Delta V_3 V_5 V_4$, $\Delta V_5 V_6 V_4$, and $\Delta V_6 V_7 V_4$, as shown in FIG. 11. In step S735, the tessellator 122 may perform the triangle striping processing shown in FIG. 8 on the triangles, to convert data of the triangles shown in FIG. 11 into data of a triangle strip.

In state S810 (initial state), the tessellator 122 may select, among the plurality of triangles, one triangle as an initial triangle of the triangle strip. Herein, a first triangle $\Delta V_0 V_1 V_2$ on a right side of the trapezoid block may be selected as the initial triangle (however, implementations in other embodiments are not limited thereto). Therefore, the tessellator 122 may select the triangle $\Delta V_0 V_1 V_2$ among the triangles shown in FIG. 11 in state S810. In state S810, the tessellator 122 may add coordinates of three vertexes $V_0$, $V_1$, and $V_2$ of the triangle $\Delta V_0 V_1 V_2$ to the data of the triangle strip. In this case, the data of the triangle strip includes "$V_0$, $V_1$, $V_2$". After state S810 is completed, the tessellator 122 enters state S820 regardless of whether the triangle selected in state S810 is an "IOI type" triangle or an "OOI type" triangle.

In state S820, the tessellator 122 may select a next triangle among the plurality of triangles. Coordinates of two vertexes of the next triangle are the same as coordinates of two vertexes of the triangle processed in state S810. For example, in FIG. 11, as $\Delta V_1 V_3 V_2$ and $\Delta V_0 V_1 V_2$ share vertexes $V_1$ and $V_2$, the tessellator 122 may select the triangle $\Delta V_1 V_3 V_2$ among the triangles shown in FIG. 11 in state S820. In state S820, the tessellator 122 may add coordinates of a vertex $V_3$ of the triangle $\Delta V_1 V_3 V_2$ to the data of the triangle strip, and discard coordinates of the vertexes $V_1$ and $V_2$ of the triangle $\Delta V_1 V_3 V_2$. In this case, the data of the triangle strip includes "$V_0$, $V_1$, $V_2$, $V_3$".

In state S820, the tessellator 122 may determine whether the current triangle belongs to the "IOI type" or the "OOI type". When the tessellator 122 determines that the three vertexes of the current triangle belong to the "IOI type", the tessellator 122 may add a cut symbol to the data of the triangle strip to end the triangle strip, and end state S820. For example, the data of the triangle strip includes "$V_0$, $V_1$, $V_2$, $V_3$, cut". The "cut" is a cut symbol indicating that the current triangle strip ends. After ending state S820, the tessellator 122 may return to state S810 to process (generate) a next triangle strip.

When the tessellator 122 determines that the three vertexes of the current triangle belong to the "OOI type", the tessellator 122 may exit state S820 and enter state S830. In state S830, the tessellator 122 may select a next triangle among the plurality of triangles. Coordinates of two vertexes of the next triangle are the same as coordinates of two vertexes of the triangle processed in state S820. For example, in FIG. 11, as $\Delta V_2V_3V_4$ and $\Delta V_1V_3V_2$ share vertexes $V_3$ and $V_2$, the tessellator 122 may select the triangle $\Delta V_2V_3V_4$ among the triangles shown in FIG. 11 in state S830. In state S830, the tessellator 122 may add coordinates of a vertex $V_4$ of the triangle $\Delta V_2V_3V_4$ to the data of the triangle strip, and discard coordinates of the vertexes $V_3$ and $V_2$ of the triangle $\Delta V_2V_3V_4$. In this case, the data of the triangle strip includes "$V_0$, $V_1$, $V_2$, $V_3$, $V_4$".

In state S830, the tessellator 122 may determine whether the current triangle belongs to the "IOI type" or the "OOI type". When the tessellator 122 determines that the three vertexes of the current triangle belong to the "OOI type", the tessellator 122 may add a cut symbol to the data of the triangle strip to end the triangle strip, and end state S830. For example, the data of the triangle strip includes "$V_0$, $V_1$, $V_2$, $V_3$, $V_4$, cut". The "cut" is a cut symbol indicating that the current triangle strip ends. After ending state S830, the tessellator 122 may return to state S810 to process (generate) a next triangle strip.

When the tessellator 122 determines that the three vertexes of the current triangle belong to the "IOI type", the tessellator 122 may exit state S830 and enter state S840. In state S840, the tessellator 122 may select a next triangle among the plurality of triangles. Coordinates of two vertexes of the next triangle are the same as the coordinates of two vertexes of the triangle processed instate S830. For example, in FIG. 11, as $\Delta V_3V_5V_4$ and $\Delta V_2V_3V_4$ share vertexes $V_3$ and $V_4$, the tessellator 122 may select the triangle $\Delta V_3V_5V_4$ among the triangles shown in FIG. 11 in state S840. In state S840, the tessellator 122 may add coordinates of a vertex $V_5$ of the triangle $\Delta V_3V_5V_4$ to the data of the triangle strip and discards coordinates of the vertexes $V_3$ and $V_4$ of the triangle $\Delta V_3V_5V_4$. In this case, the data of the triangle strip includes "$V_0$, $V_1$, $V_2$, $V_3$, $V_4$, $V_5$".

In state S840, the tessellator 122 may determine whether the current triangle belongs to the "IOI type" or the "OOI type". When the tessellator 122 determines that the three vertexes of the current triangle belong to the "IOI type", the tessellator 122 may add a cut symbol to the data of the triangle strip to end the triangle strip, and end state S840. For example, the data of the triangle strip includes "$V_0$, $V_1$, $V_2$, $V_3$, $V_4$, $V_5$, cut". The "cut" is a cut symbol indicating that the current triangle strip ends. After ending state S840, the tessellator 122 may return to state S810 to process (generate) a next triangle strip.

When the tessellator 122 determines that the three vertexes of the current triangle belong to the "OOI type", the tessellator 122 may exit state S840 and enter state S830. As the operation of state S830 is described above, details are not described again. For example, in FIG. 11, as $\Delta V_5V_6V_4$ and $\Delta V_3V_5V_4$ share vertexes $V_5$ and $V_4$, the tessellator 122 may select the triangle $\Delta V_5V_6V_4$ among the triangles shown in FIG. 11 in state S830. In state S830, the tessellator 122 may add coordinates of a vertex $V_6$ of the triangle $\Delta V_5V_6V_4$ to the data of the triangle strip, and discard coordinates of the vertexes $V_5$ and $V_4$ of the triangle $\Delta V_5V_6V_4$. In this case, the data of the triangle strip includes "$V_0$, $V_1$, $V_2$, $V_3$, $V_4$, $V_5$, $V_6$".

In state S830, the tessellator 122 may determine that the current triangle $\Delta V_5V_6V_4$ belongs to the "OOI type". Therefore, the tessellator 122 may add a cut symbol to the data of the triangle strip to end the triangle strip, and end state S830 and return to state S810. In this case, a triangle strip is generated, and includes data "$V_0$, $V_1$, $V_2$, $V_3$, $V_4$, $V_5$, $V_6$, cut".

When returning to state S810, the tessellator 122 may select the triangle $\Delta V_6V_7V_4$ shown in FIG. 11 as an initial triangle of a new triangle strip. As all triangles of a current trapezoid block are processed, the tessellator 122 adds a cut symbol to data of the triangle strip. In this case, the data of the new triangle strip includes "$V_6$, $V_7$, $V_4$, cut".

Therefore, the tessellator 122 may convert triangle data "$V_0$, $V_1$, $V_2$", "$V_0$, $V_3$, $V_2$", "$V_2$, $V_3$, $V_4$", "$V_3$, $V_5$, $V_4$", "$V_5$, $V_6$, $V_4$", and "$V_6$, $V_7$, $V_4$" into triangle strip data "$V_0$, $V_1$, $V_2$, $V_3$, $V_4$, $V_5$, $V_6$, cut" and "$V_6$, $V_7$, $V_4$, cut". The triangle data includes coordinates of 6*3=18 vertexes. The triangle strip data includes coordinates of 7+3=10 vertexes. The tessellator 122 may perform the triangle striping processing of "converting a plurality of triangles into a triangle strip" to effectively reduce a data amount (a number of vertexes), to reduce subsequent drawing and calculation burden.

Figure 12:
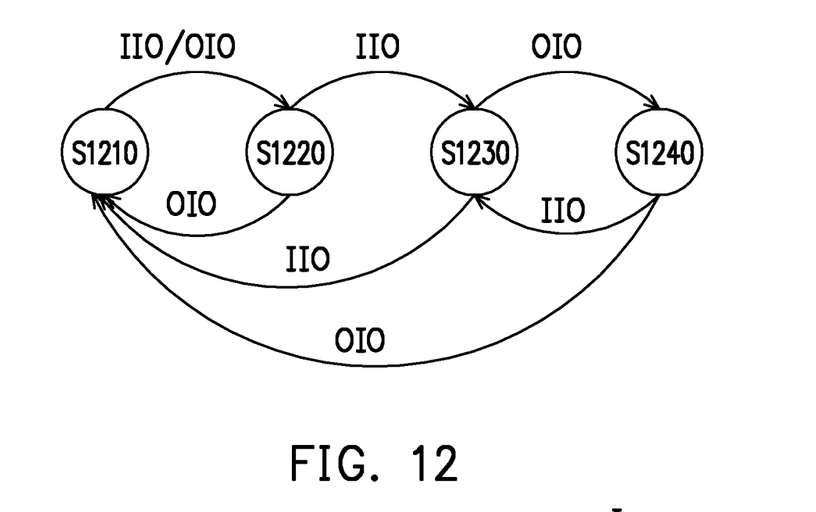
FIG. 12 is a schematic diagram of a finite state of a triangle striping processing step shown in FIG. 7 according to another embodiment of the disclosure.

FIG. 12 is a schematic diagram of a finite state of step S735 (triangle striping processing) shown in FIG. 7 according to another embodiment of the disclosure. In the embodiment shown in FIG. 12, the triangle striping processing includes state S1210, state S1220, state S1230, and state S1240. State S1210 is an initial state. For ease of description, the triangles generated in step S730 may be classified into an "IIO type" triangle and an "OIO type" triangle. The "IIO type" triangle and the "OIO type" triangle are defined in FIG. 13 and FIG. 14.

Figure 13:
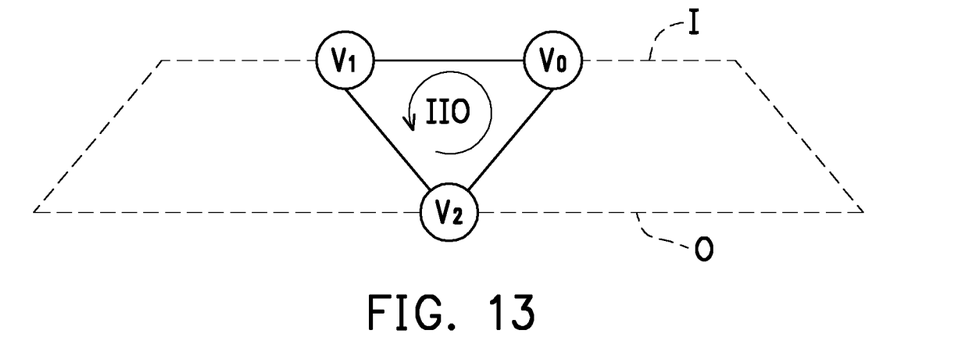
FIG. 13 is a schematic diagram of an "in-in-out (IIO) type" triangle according to an embodiment of the disclosure.

FIG. 13 is a schematic diagram of the "IIO type" triangle according to an embodiment of the disclosure. A graphic symbol "O" shown in FIG. 13 represents a lower base (an outer side, namely, a side facing towards an outer side of a ring block) of a trapezoid block. A graphic symbol "I" shown in FIG. 13 represents an upper base (an inner side, namely, a side facing towards an inner side of the ring block) of the trapezoid block. In a counter clockwise direction, as a triangle $\Delta V_0V_1V_2$ shown in FIG. 13 has vertexes $V_0$ and $V_1$ located on the inner side "I" and a vertex $V_2$ located on the outer side "O", the triangle $\Delta V_0V_1V_2$ shown in FIG. 13 is an "IIO type" triangle.

Figure 14:
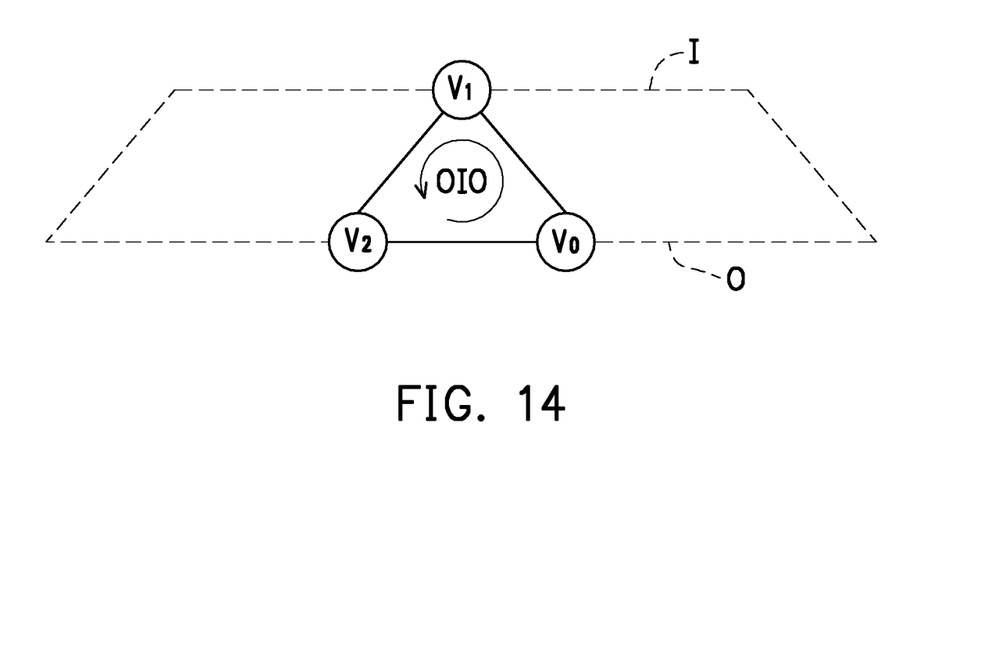
FIG. 14 is a schematic diagram of an "out-in-out (OIO) type" triangle according to an embodiment of the disclosure.

FIG. 14 is a schematic diagram of the "OIO type" triangle according to an embodiment of the disclosure. Same as the related description of FIG. 13, a graphic symbol "O" shown in FIG. 14 represents an outer side of a trapezoid block, and a graphic symbol "I" shown in FIG. 14 represents an inner side of the trapezoid block. In a counter clockwise direction, as a triangle $\Delta V_0V_1V_2$ shown in FIG. 14 has vertexes $V_0$ and $V_2$ located on the outer side "O" and a vertex $V_1$ located on the inner side "I", the triangle $\Delta V_0V_1V_2$ shown in FIG. 14 is an "OIO type" triangle.

Referring to FIG. 12, instate S210 (initial state), the tessellator 122 may select, among the plurality of triangles, one triangle as an initial triangle of the triangle strip. Herein, a first triangle on a right side of the trapezoid block may be selected as the initial triangle (however, implementations in other embodiments are not limited thereto). In state S1210, the tessellator 122 may add coordinates of three vertexes $V_0$, $V_1$, and $V_2$ of the triangle $\Delta V_0V_1V_2$ to the data of the triangle strip. After state S1210 is completed, the tessellator 122 enters state S1220 regardless of whether the triangle selected in state S1210 is an "IIO type" triangle or an "OIO type" triangle.

In state S1220, the tessellator 122 may select a next triangle among the plurality of triangles. Coordinates of a first vertex and coordinates of a second vertex of the next triangle are the same as coordinates of two vertexes of the triangle processed in state S1210. In state S1220, the tessellator 122 may add coordinates of a third vertex of the selected triangle to the data of the triangle strip, and discard the coordinates of the first vertex and the coordinates of the second vertex of the selected triangle.

The tessellator 122 may determine whether the current triangle belongs to the "IIO type" or the "OIO type". When the tessellator 122 determines that the three vertexes of the current triangle belong to the "OIO type", the tessellator 122 may add a cut symbol to the data of the triangle strip to end the triangle strip, and end state S1220. After ending state S1220, the tessellator 122 may return to state S1210 to process (generate) a next triangle strip.

When the tessellator 122 determines in state S1220 that the three vertexes of the current triangle belong to the "IIO type", the tessellator 122 may exit state S1220 and enter state S1230. In state S1230, the tessellator 122 may select a next triangle among the plurality of triangles. Coordinates of a first vertex and coordinates of a second vertex of the next triangle are the same as coordinates of two vertexes of the triangle processed in state S1220. In state S1230, the tessellator 122 may add coordinates of a third vertex of the selected triangle to the data of the triangle strip, and discard the coordinates of the first vertex and the coordinates of the second vertex of the selected triangle.

In state S1230, the tessellator 122 may determine whether the current triangle belongs to the "IIO type" or the "OIO type". When the tessellator 122 determines that the three vertexes of the current triangle belong to the "IIO type", the tessellator 122 may add a cut symbol to the data of the triangle strip to end the triangle strip, and end state S1230. After ending state S1230, the tessellator 122 may return to state S1210 to process (generate) a next triangle strip.

When the tessellator 122 determines in state S1230 that the three vertexes of the current triangle belong to the "OIO type", the tessellator 122 may exit state S1230 and enter state S1240. In state S1240, the tessellator 122 may select a next triangle among the plurality of triangles. Coordinates of a first vertex and coordinates of a second vertex of the next triangle are the same as coordinates of two vertexes of the triangle processed in state S1230. In state S1240, the tessellator 122 may add coordinates of a third vertex of the selected triangle to the data of the triangle strip, and discard the coordinates of the first vertex and the coordinates of the second vertex of the selected triangle.

In state S1240, the tessellator 122 may determine whether the current triangle belongs to the "IIO type" or the "OIO type". When the tessellator 122 determines that the three vertexes of the current triangle belong to the "OIO type", the tessellator 122 may add a cut symbol to the data of the triangle strip to end the triangle strip, and end state S1240. After ending state S1240, the tessellator 122 may return to state S1210 to process (generate) a next triangle strip. When the tessellator 122 determines in state S1240 that the three vertexes of the current triangle belong to the "IIO type", the tessellator 122 may exit state S1240 and enter state S1230. As the operation of state S1230 has been described above, details are not described again.

Figure 15:
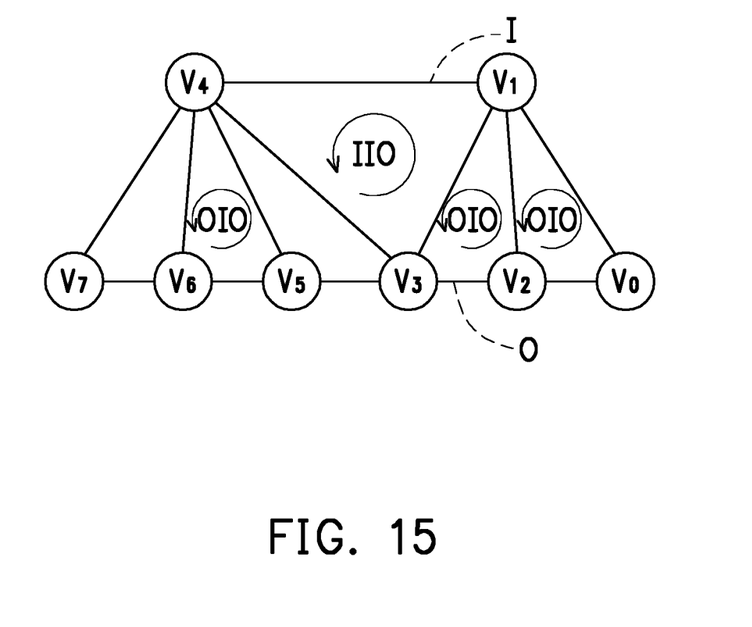
FIG. 15 is a schematic diagram of dividing a trapezoid block into a plurality of triangles according to an embodiment of the disclosure.

FIG. 15 is a schematic diagram of dividing a trapezoid block into a plurality of triangles according to an embodiment of the disclosure. In step S730 shown in FIG. 7, the tessellator 122 may divide a trapezoid block "$V_0V_7V_4V_1$" shown in FIG. 15 into a plurality of triangles: $\Delta V_0V_1V_2$, $\Delta V_2V_1V_3$, $\Delta V_1V_4V_3$, $\Delta V_3V_4V_5$, $\Delta V_5V_4V_6$, and $\Delta V_6V_4V_7$, as shown in FIG. 15. In step S735 shown in FIG. 7, the tessellator 122 may perform the triangle striping processing shown in FIG. 12 on the triangles, to convert data of the triangles shown in FIG. 15 into data of a triangle strip.

Referring to FIG. 12 and FIG. 15, in state S1210 (initial state), the tessellator 122 may select, among the plurality of triangles, one triangle as an initial triangle of the triangle strip. Herein, a first triangle $\Delta V_0V_1V_2$ on a right side of the trapezoid block may be selected as the initial triangle (however, implementations in other embodiments are not limited thereto). Therefore, the tessellator 122 may select the triangle $\Delta V_0V_1V_2$ among the triangles shown in FIG. 15 instate S1210. In state S1210, the tessellator 122 may add coordinates of three vertexes $V_0$, $V_1$, and $V_2$ of the triangle $\Delta V_0V_1V_2$ to the data of the triangle strip. In this case, the data of the triangle strip includes "$V_0$, $V_1$, $V_2$". After state S1210 is completed, the tessellator 122 enters state S1220 regardless of whether the triangle selected in state S1210 is an "IIO type" triangle or an "OIO type" triangle.

In state S1220, the tessellator 122 may select a next triangle among the plurality of triangles. Coordinates of two vertexes of the next triangle are the same as coordinates of two vertexes of the triangle processed in state S1210. For example, in FIG. 15, as $\Delta V_2V_1V_3$ and $\Delta V_0V_1V_2$ share vertexes $V_1$ and $V_2$, the tessellator 122 may select the triangle $\Delta V_2V_1V_3$ among the triangles shown in FIG. 15 instate S1220. In state S1220, the tessellator 122 may add coordinates of a vertex $V_3$ of the triangle $\Delta V_2V_1V_3$ to the data of the triangle strip, and discard coordinates of the vertexes $V_1$ and $V_2$ of the triangle $\Delta V_2V_1V_3$. In this case, the data of the triangle strip includes "$V_0$, $V_1$, $V_2$, $V_3$".

In state S1220, the tessellator 122 may determine whether the current triangle belongs to the "IIO type" or the "OIO type". As the three vertexes of the current triangle $\Delta V_2V_1V_3$ belong to the "OIO type", the tessellator 122 may add a cut symbol to the data of the triangle strip to end the triangle strip, and end state S1220. In this case, the data of the triangle strip includes "$V_0$, $V_1$, $V_2$, $V_3$, cut". The "cut" is a cut symbol indicating that the current triangle strip ends. After ending state S1220, the tessellator 122 may return to state S1210 to process (generate) a next triangle strip.

In state S1210, the tessellator 122 may select a next triangle $\Delta V_1V_4V_3$ among the plurality of triangles. In state S1210, the tessellator 122 may add coordinates of three vertexes $V_1$, $V_4$, and $V_3$ of the triangle $\Delta V_1V_4V_3$ to the data of the triangle strip. In this case, the data of the triangle strip includes "$V_1$, $V_4$, $V_3$". After state S1210 is completed, the tessellator 122 enters state S1220 regardless of whether the triangle selected in state S1210 is an "IIO type" triangle or an "OIO type" triangle.

In state S1220, the tessellator 122 may select a triangle $\Delta V_3V_4V_5$. Coordinates of two vertexes $V_3$ and $V_4$ of the next triangle $\Delta V_3V_4V_5$ are the same as coordinates of two vertexes $V_3$ and $V_4$ of the triangle $\Delta V_1V_4V_3$ processed in state S1210. In state S1220, the tessellator 122 may add coordinates of a vertex $V_5$ of the triangle $\Delta V_3V_4V_5$ to the data of the triangle strip, and discard coordinates of the vertexes $V_3$ and $V_4$ of the triangle $\Delta V_3V_4V_5$. In this case, the data of the triangle strip includes "$V_1$, $V_4$, $V_3$, $V_5$".

In state S1220, the tessellator 122 may determine whether the current triangle $\Delta V_3V_4V_5$ belongs to the "IIO type" or the "OIO type". As the three vertexes of the current triangle $\Delta V_3V_4V_5$ belong to the "OIO type", the tessellator 122 may add a cut symbol to the data of the triangle strip to end the triangle strip, and end state S1220. In this case, the data of the triangle strip includes "$V_1$, $V_4$, $V_3$, $V_5$, cut". The "cut" is a cut symbol indicating that the current triangle strip ends. After ending state S1220, the tessellator 122 may return to state S1210 to process (generate) a next triangle strip.

In state S1210, the tessellator 122 may select a next triangle $\triangle V_5V_4V_6$. In state S1210, the tessellator 122 may add coordinates of three vertexes $V_5$, $V_4$, and $V_6$ of the triangle $\triangle V_5V_4V_6$ to the data of the triangle strip. In this case, the data of the triangle strip includes "$V_5$, $V_4$, $V_6$". After state S1210 is completed, the tessellator 122 enters state S1220 regardless of whether the triangle selected in state S1210 is an "IIO type" triangle or an "OIO type" triangle.

In state S1220, the tessellator 122 may select a triangle $\triangle V_6V_4V_7$. Coordinates of two vertexes $V_4$ and $V_6$ of the next triangle $\triangle V_6V_4V_7$ are the same as coordinates of two vertexes $V_4$ and $V_6$ of the triangle $\triangle V_5V_4V_6$ processed in state S1210. In state S1220, the tessellator 122 may add coordinates of a vertex $V_7$ of the triangle $\triangle V_6V_4V_7$ to the data of the triangle strip, and discard coordinates of the vertexes $V_6$ and $V_4$ of the triangle $\triangle V_6V_4V_7$. In this case, the data of the triangle strip includes "$V_5$, $V_4$, $V_6$, $V_7$". As all the triangles of the current trapezoid block are processed, the tessellator 122 may add a cut symbol to the data of the triangle strip to end the triangle strip, and end state S1220. In this case, the data of the triangle strip includes "$V_5$, $V_4$, $V_6$, $V_7$, cut". The "cut" is a cut symbol indicating that the current triangle strip ends.

Therefore, the tessellator 122 may convert triangle data "$V_0$, $V_1$, $V_2$", "$V_2$, $V_1$, $V_3$", "$V_1$, $V_4$, $V_3$", "$V_3$, $V_4$, $V_5$", "$V_5$, $V_4$, $V_6$", and "$V_6$, $V_4$, $V_7$" into triangle strip data "$V_0$, $V_1$, $V_2$, $V_3$, cut", "$V_1$, $V_4$, $V_3$, $V_5$, cut", and "$V_5$, $V_4$, $V_6$, $V_7$, cut". The triangle data includes coordinates of 6*3=18 vertexes. The triangle strip data includes coordinates of 4+4+4=12 vertexes. The tessellator 122 may perform the triangle striping processing of "converting a plurality of triangles into a triangle strip" to effectively reduce a data amount (a number of vertexes), to reduce subsequent drawing and calculation burden.

According to different design requirements, blocks of the graphics processing apparatus 100, the pre-processing circuit 110, the tessellation circuit 120, the hull shader 121, the tessellator 122, the domain shader 123, and (or) the post-processing circuit 130 may be implemented by hardware, firmware, software (a program), or a combination thereof.

When being implemented by hardware, the blocks of the graphics processing apparatus 100, the pre-processing circuit 110, the tessellation circuit 120, the hull shader 121, the tessellator 122, the domain shader 123, and (or) the post-processing circuit 130 may be implemented as logical circuits on an integrated circuit. Related functions of the graphics processing apparatus 100, the pre-processing circuit 110, the tessellation circuit 120, the hull shader 121, the tessellator 122, the domain shader 123, and (or) the post-processing circuit 130 may be implemented as hardware by using a hardware description language (such as Verilog HDL or VHDL)) or other suitable programming languages. For example, the related functions of the graphics processing apparatus 100, the pre-processing circuit 110, the tessellation circuit 120, the hull shader 121, the tessellator 122, the domain shader 123, and (or) the post-processing circuit 130 may be implemented as one or more controllers, micro controllers, microprocessors, application-specific integrated circuits (ASICs), digital signal processors (DSPs), field programmable gate arrays (FPGAs), and/or logical blocks, modules, and circuits in other processing units.

When being implemented by software or firmware, related functions of the graphics processing apparatus 100, the pre-processing circuit 110, the tessellation circuit 120, the hull shader 121, the tessellator 122, the domain shader 123, and (or) the post-processing circuit 130 may be implemented as program codes. For example, the graphics processing apparatus 100, the pre-processing circuit 110, the tessellation circuit 120, the hull shader 121, the tessellator 122, the domain shader 123, and (or) the post-processing circuit 130 may be implemented by using a common programming language (such as C, C++, or a combined language) or other suitable programming languages. The program code may be recorded/stored in a recording medium. The recording medium includes, for example, a read-only memory (ROM), a storage apparatus, and/or a random access memory (RAM). A computer, a central processing unit (CPU), a controller, a micro controller, or a microprocessor may read the program code from the recording medium and run the program code, to implement the related functions. The recording medium may be a "non-transitory computer readable medium", for example, a tape, a disk, a card, a semiconductor memory, or a programmable logical circuit. Furthermore, the program may be provided to the computer (or the CPU) by any transmission medium (a communication network or a radio wave). The communication network is, for example, the Internet, wired communication, wireless communication, or other communication media.

Based on the above, the tessellation circuit 120 in the embodiments of the disclosure may subdivide a patch in an image frame into a plurality of triangles. The tessellation circuit 120 may convert the triangles into at least one triangle strip by considering continuity between these vertexes of the triangles. Therefore, the graphics processing apparatus 100 may effectively reduce a data amount of the vertexes of the triangles.

Although the disclosure is described with reference to the above embodiments, the embodiments are not intended to limit the disclosure. Persons of ordinary skill in the art may make variations and modifications without departing from the spirit and scope of the disclosure. Therefore, the protection scope of the disclosure should be subject to the appended claims.

What is claimed is:
1. A graphics processing apparatus, comprising:
a tessellation circuit, configured to perform tessellation processing to subdivide a patch in an image frame into a plurality of triangles and perform triangle striping processing to convert data of the plurality of triangles into data of a triangle strip; and
a post-processing circuit, coupled to the tessellation circuit to receive the data of the triangle strip and configured to perform subsequent processing on the data of the triangle strip,
wherein the triangle striping processing performed by the tessellation circuit comprises:
selecting, in a first state and among the plurality of triangles, a first triangle on a right side of a trapezoid block as an initial triangle of the triangle strip;
adding, in the first state, coordinates of three vertexes of the first triangle to the data of the triangle strip;
selecting, in a second state, a second triangle among the plurality of triangles, wherein coordinates of a first vertex and coordinates of a second vertex of the second triangle are identical to the coordinates of two of the three vertexes of the first triangle, and
adding, in the second state, coordinates of a third vertex of the second triangle to the data of the triangle strip and discarding the coordinates of the first vertex and the coordinates of the second vertex of the second triangle.

2. The graphics processing apparatus according to claim 1, wherein the post-processing circuit comprises at least one of a geometry shader, a raster, and a pixel shader.

3. The graphics processing apparatus according to claim 1, further comprising:
a pre-processing circuit, coupled to the tessellation circuit to provide the patch.

4. The graphics processing apparatus according to claim 3, wherein the pre-processing circuit comprises a vertex shader.

5. The graphics processing apparatus according to claim 1, wherein the tessellation processing performed by the tessellation circuit comprises:
dividing the patch into a plurality of ring blocks;
dividing one of the plurality of ring blocks into a plurality of trapezoid blocks; and
dividing one of the plurality of trapezoid blocks into the plurality of triangles.

6. The graphics processing apparatus according to claim 1, wherein the triangle striping processing performed by the tessellation circuit further comprises:
adding a cut symbol to the data of the triangle strip to end the triangle strip and ending the second state when the three vertexes of the second triangle belong to an "in-out- (IOI) type"; and
exiting the second state and entering a third state when the three vertexes of the second triangle belong to an "out-out-in (OOI) type".

7. The graphics processing apparatus according to claim 6, wherein the triangle striping processing performed by the tessellation circuit further comprises:
selecting, in the third state, a third triangle among the plurality of triangles, wherein coordinates of a first vertex and coordinates of a second vertex of the third triangle are identical to the coordinates of two of the three vertexes of the second triangle; and
adding, in the third state, coordinates of a third vertex of the third triangle to the data of the triangle strip and discarding the coordinates of the first vertex and the coordinates of the second vertex of the third triangle.

8. The graphics processing apparatus according to claim 7, wherein the triangle striping processing performed by the tessellation circuit further comprises:
adding the cut symbol to the data of the triangle strip to end the triangle strip and ending the third state when the three vertexes of the third triangle belong to the "OOI type"; and
exiting the third state and entering a fourth state when the three vertexes of the third triangle belong to the "IOI type".

9. The graphics processing apparatus according to claim 8, wherein the triangle striping processing performed by the tessellation circuit further comprises:
selecting, in the fourth state, a fourth triangle among the plurality of triangles, wherein coordinates of a first vertex and coordinates of a second vertex of the fourth triangle are identical to the coordinates of two of the three vertexes of the third triangle; and
adding, in the fourth state, coordinates of a third vertex of the fourth triangle to the data of the triangle strip and discarding the coordinates of the first vertex and the coordinates of the second vertex of the fourth triangle.

10. The graphics processing apparatus according to claim 9, wherein the triangle striping processing performed by the tessellation circuit further comprises:
adding the cut symbol to the data of the triangle strip to end the triangle strip and ending the fourth state when the three vertexes of the fourth triangle belong to the "IOI type"; and
exiting the fourth state and entering the third state when the three vertexes of the fourth triangle belong to the "OOI type".

11. The graphics processing apparatus according to claim 1, wherein the triangle striping processing performed by the tessellation circuit further comprises:
adding a cut symbol to the data of the triangle strip to end the triangle strip and ending the second state when the three vertexes of the second triangle belong to an "out-in-out (OIO) type"; and
exiting the second state and entering a third state when the three vertexes of the second triangle belong to an "in-in-out (IIO) type".

12. The graphics processing apparatus according to claim 11, wherein the triangle striping processing performed by the tessellation circuit further comprises:
selecting, in the third state, a third triangle among the plurality of triangles, wherein coordinates of a first vertex and coordinates of a second vertex of the third triangle are identical to the coordinates of two of the three vertexes of the second triangle; and
adding, in the third state, coordinates of a third vertex of the third triangle to the data of the triangle strip and discarding the coordinates of the first vertex and the coordinates of the second vertex of the third triangle.

13. The graphics processing apparatus according to claim 12, wherein the triangle striping processing performed by the tessellation circuit further comprises:
adding the cut symbol to the data of the triangle strip to end the triangle strip and ending the third state when the three vertexes of the third triangle belong to the "IIO type"; and
exiting the third state and entering a fourth state when the three vertexes of the third triangle belong to the "OIO type".

14. The graphics processing apparatus according to claim 13, wherein the triangle striping processing performed by the tessellation circuit further comprises:
selecting, in the fourth state, a fourth triangle among the plurality of triangles, wherein coordinates of a first vertex and coordinates of a second vertex of the fourth triangle are identical to the coordinates of two of the three vertexes of the third triangle; and
adding, in the fourth state, coordinates of a third vertex of the fourth triangle to the data of the triangle strip and discarding the coordinates of the first vertex and the coordinates of the second vertex of the fourth triangle.

15. The graphics processing apparatus according to claim 14, wherein the triangle striping processing performed by the tessellation circuit further comprises:
adding the cut symbol to the data of the triangle strip to end the triangle strip and ending the fourth state when the three vertexes of the fourth triangle belong to the "OIO type"; and
exiting the fourth state and entering the third state when the three vertexes of the fourth triangle belong to the "IIO type".

* * * * *